United States Patent [19]

Ukita et al.

[11] Patent Number: 5,298,179
[45] Date of Patent: Mar. 29, 1994

[54] WATER ABSORBENT, COMPRISING MAGNETIC MATERIAL AND WATER ABSORBENT RESIN

[75] Inventors: Keizo Ukita; Shinji Hirota; Masaaki Inoue, all of Yokohama, Japan

[73] Assignee: Nippon Zeon Co., Ltd., Tokyo, Japan

[21] Appl. No.: 725,425

[22] Filed: Jul. 3, 1991

[30] Foreign Application Priority Data

Jul. 4, 1990 [JP] Japan ................................ 2-177060

[51] Int. Cl.$^5$ ............................................. C04B 35/04
[52] U.S. Cl. ................. 252/62.54; 252/62.53; 44/626
[58] Field of Search ............... 252/62.54, 62.53, 184, 252/175; 44/626

[56] References Cited

U.S. PATENT DOCUMENTS

| | | | |
|---|---|---|---|
| 3,591,411 | 7/1971 | Faulhaber | 34/9 |
| 4,101,435 | 7/1978 | Hasegawa | 252/62.53 |
| 4,211,664 | 7/1980 | Dixon et al. | 252/62.54 |
| 4,320,040 | 3/1982 | Fujita | 524/459 |
| 4,322,219 | 3/1982 | Burns | 44/626 |
| 4,687,748 | 8/1987 | Schroeder | 252/62.54 |
| 4,695,393 | 9/1987 | Whitehead | 252/62.54 |
| 4,719,027 | 1/1988 | Raistrick | 252/62.54 |
| 4,965,007 | 10/1990 | Yudelson | 252/62.53 |
| 5,065,822 | 11/1991 | Miller et al. | 166/294 |

FOREIGN PATENT DOCUMENTS

| | | |
|---|---|---|
| 174453 | 10/1983 | Japan . |
| 125436 | 6/1986 | Japan . |
| 63-134003 | 6/1986 | Japan . |
| 63-134008 | 6/1988 | Japan . |
| 29257 | 1/1989 | Japan . |
| 2006789A | 10/1979 | United Kingdom . |

OTHER PUBLICATIONS

Hackh's Chemical Dictionary, 1969/1972, p. 543.

*Primary Examiner*—Prince Willis, Jr.
*Assistant Examiner*—J. Silbermann
*Attorney, Agent, or Firm*—Sherman and Shalloway

[57] ABSTRACT

There is provided a water absorbent comprising a magnetic material and a highly water-absorbable resin. Said water absorbent is contacted with a moisture-containing powder and the water absorbent that has absorbed the moisture is then separated from the powder by means of a magnet, whereby the moisture content of the moisture-containing powder can be decreased. Said water absorbent is produced by forming a mixture composed of the highly water-absorbable resin, water and the magnetic material and then drying said mixture.

2 Claims, No Drawings

WATER ABSORBENT, COMPRISING MAGNETIC MATERIAL AND WATER ABSORBENT RESIN

This invention relates to a water absorbent comprising a magnetic material and a highly water-absorbable resin. More specifically, this invention relates to a method for decreasing a moisture content of a moisture-containing powder using the water absorbent.

A variety of methods for decreasing a moisture contained in a powder of a coking coal, etc. have been hitherto proposed.

For instance, in case of a coking coal, in order to previously decrease a moisture content of a starting coal charged into a coke oven, drying is generally conducted using an indirect heating-type dryer that utilizes a latent heat of a combustion exhaust gas of the coke oven or a gas formed in the coke oven as a heat carrier (e.g. Japanese Laid-open (Kokai) Patent Application Nos. 5389/1983, 37082/1983 and 37083/1983). In this method, however, quite a large amount of a heat and a big drying equipment are required to dry the large amount of the starting coal. Moreover, when the moisture content of the starting coal becomes less than 5%, a dust is formed; a dust collector, etc. are therefore newly required to prevent contamination of working environment or to eliminate problems of environmental pollution.

Meanwhile, to decrease the moisture of the starting coal without heat-drying, as described in e.g. Japanese Laid-open Patent Application No. 151294/1986, there is a method comprising mixing the starting coal with a water-absorbable/water-desorbable polymer, absorbing the moisture of the starting coal into the water-absorbable/water-desorbable polymer, then separating the starting coal from the water-absorbable/water-desorbable polymer, and recovering the separated water-absorbable/water-desorbable polymer. In this method, however, the water-absorbable/water-desorbable polymer becomes fine while mixing the starting coal with the water-absorbable/water-desorbable polymer, so that a difference in size between said polymer and the starting coal is eliminated. Accordingly, an efficiency of separating and recovering the water-absorbable/ water-desorbable polymer by sieving is reduced, making it impossible to sufficiently achieve an inherent purpose of decreasing the moisture content of the starting coal.

An object of this invention is to solve the aforesaid problems.

The present inventors have made assiduous investigations to achieve the object, and consequently discovered that if a water absorbent comprising a magnetic material and a highly water-absorbable resin is contacted with a moisture-containing powder to absorb the moisture into the water absorbent and the water absorbent is separated using a magnet, the moisture content of the powder can be decreased with good efficiency, and that the recovered water absorbent is reusable if desorbing the absorbed moisture.

Thus, in accordance with this invention, there is provided a water absorbent comprising a magnetic material and a highly water-absorbable resin. Further, in accordance with this invention, there are provided a process for producing a water absorbent, which comprises forming a mixture composed of a highly water-absorbable resin, water and a magnetic material and then drying the mixture, and a process for producing a water absorbent, which comprises forming a mixture comprising a magnetic material and an aqueous solution of a water-soluble high-molecular compound that is converted into a highly water-absorbable resin by crosslinking, then crosslinking said water-soluble high-molecular compound and drying said mixture.

Still further, in accordance with this invention, there is provided a method for decreasing a moisture content of a moisture-containing powder, which comprises contacting the water absorbent with the moisture-containing powder and then separating the water absorbent that has absorbed the moisture from the powder using a magnet.

As the magnetic material used in this invention, any powder of a magnetic material will do. Examples thereof are powders of pure iron, iron alloy, magnetic oxide materials, etc. Examples of the powder of the iron alloy are Fe-Ni, Fe-Si, Fe-Al, and Fe-Co. Examples of the powder of the oxidized magnetic material are alpha-$Fe_2O_3$ and $Fe_3O_4$. Strongly magnetic materials are preferable to weakly magnetic materials.

The highly water-absorbable resin used in this invention is an organic high-molecular compound that forms an aqueous gel and a water-insoluble resin with a high-molecular network which is three-dimensionally crosslinked either physically or chemically. Water is absorbed into the high-molecular network of the resin to form an aqueous gel. Absorbability of the highly water-absorbable resin is not limited in particular. It is advisable to absorb distilled water in a weight which is 5-1000 times its own weight.

The highly water-absorbable resin is obtained by introducing a physical or chemical crosslink into a water-soluble high-molecular compound.

The highly water-absorbable resin can also be obtained also by crosslinking a water-insoluble high-molecular compound and then imparting a hydrophilic portion via hydrolysis.

The water-soluble high-molecular compound into which a crosslink can be introduced is not particularly limited, and any known compound is available. Examples of the water-soluble high-molecular compound are a starch-acrylonitrile copolymer hydrolyzate, a polyacrylonitrile hydrolyzate, polyethylene oxide, a vinyl acetate-acrylic acid salt copolymer hydrolyzate, a vinyl acetate-acrylic acid ester copolymer hydrolyzate, a vinyl alcohol-acrylic acid salt copolymer, a polyacrylic acid salt and an olefin-maleic anhydride copolymer hydrolyzate.

These water-soluble high-molecular compounds can be converted into highly water-absorbable resins by crosslinking in a suitable manner.

A method for crosslinking the water-soluble high-molecular compound is not particularly limited. Examples of said method are a method in which a polar group is introduced into a water-soluble high-molecular compound to allow intramolecular or intermolecular hydrogenation; a method in which a water-soluble high-molecular compound is formed in the presence of a polyfunctional crosslinking agent; a method in which a functional group of a water-soluble high-molecular compound is reacted; a method in which crosslinking is performed by irradiating a water-soluble high-molecular compound with radioactive rays; and a method in which a hydrophobic group or a crystalline structure is introduced into a water-soluble high-molecular compound.

The water absorbent of this invention can be obtained by crying an aqueous gel composed of a highly water-absorbable resin and water and a magnetic material. A method for obtaining such a mixture is not particularly limited. Examples of said method are a method comprising absorbing a suitable amount of water into a high-molecular network of a highly water-absorbable resin to form an aqueous gel, then adding a magnetic material and mechanically mixing it with the aqueous gel; a method in which a highly water-absorbable resin, water and a magnetic material are mixed at once; a method in which a magnetic material is added to an aqueous solution of a water-soluble high-molecular compound to mix them, and the water-soluble high-molecular compound is crosslinked in a suitable manner; and a method in which a water-soluble high-molecular compound resulting from polymerization in the presence of a magnetic material is crosslinked in a suitable manner.

The mixture of the magnetic material and the aqueous gel of the highly water-absorbable resin is dried for properly decreasing the moisture content or removing the moisture in the aqueous gel. A method for decreasing the moisture content or removing the moisture in the aqueous gel is not particularly limited. For example, a method is taken in which heat-drying is conducted with a dryer at a temperature at which the highly water-absorbable resin is not decomposed, preferably 100° to 180° C. The other drying methods are also available.

The water absorbent of this invention can be used by pulverizing it as required and adjusting it to a suitable size. The size of the water absorbent is not particularly limited. A size in which the powder can fully be contacted with the water absorbent is desirable. The size of the water absorbent is usually 0.5 to 5 mm, preferably 1 to 3 mm. When the size of the water absorbent is less than the above, a sufficient amount of the magnetic material cannot be contained therein, and the water absorbent that has absorbed the moisture cannot be separated from the powder with the magnet. When the size of the water absorbent is larger than the above, the contact efficiency of the powder and the water absorbent is undesirously decreased.

The amount of the magnetic material being mixed with the aqueous gel of the highly water-absorbable resin is not particularly limited. Preferable is an amount in which the water absorbent that has absorbed a moisture can be separated from the powder by a magnet.

A magnetic material/highly water-absorbable resin weight ratio is usually 1/20 to 5/1.

In order to decrease the moisture content of the powder using the water absorbent of this invention, the moisture-containing powder and the water absorbent are mechanically mixed and contacted for an enough time to absorb the moisture into the water absorbent, and the mixture of the powder and the water absorbent is then contacted with the magnet, thereby separating the water absorbent that has adsorbed the moisture from the powder. The water absorbent separated and recovered can be reused by removing the moisture absorbed in the water absorbent with a heat dryer.

The amount of the water absorbent which is contacted with the powder is not particularly limited. Preferable is more than an amount in which the moisture contained in the powder can sufficiently be absorbed. Said amount is usually 0.005 to 20% by weight based on the total amount of the water absorbent and the powder as an amount of a highly water-absorbable resin that forms the water absorbent.

A time for which the moisture-containing powder and the water absorbent are contacted with each other is not particularly limited. Preferable is an enough time to absorb the moisture into the water absorbent. Said time is usually 3 minutes to 4 hours, more preferably 30 minutes to 2 hours.

The magnet used in this invention is not particularly limited and can be optionally selected by the amount, form, etc., of the powder. Examples thereof are usual magnetic separators such as an electromagnetic suspension separator, a permanent magnet suspension separator, an electromagnetic drum, an electromagnetic pulley, a magnet conveyor, and an electromagnetic round separator.

Examples of the powder that can decrease the moisture content by the process of this invention are alumina, quartz sand, broken stone, clay, talc, cement, carbon black, activated sludge, coal, and wood chips. This invention can be applied to powders in a wide variety of fields such as food, chemistry, paper-making, metal mine, casting, ceramic industry, etc., unless they are magnetic.

Thus, the novel water absorbent of this invention can decrease the moisture content with good efficiency from the powder by contacting it with the moisture-containing powder and then separating it with the magnet.

When the powder is the coking coal, the moisture content can be decreased with good efficiency, as well as the filling density to the coke oven and the qualities of the coke can be ameliorated.

The following Examples and Comparative Examples illustrate this invention more specifically. In said Examples, parts and percentages are all by weight unless otherwise indicated. A moisture content, a magnet, a magnetic powder and a resin in Examples are as follows.

1) Moisture content

After the powder was dried in an oven at 107° C. for 1 hour, the weight loss was shown by percentage based on the weight before drying.

2) Magnet

Magnetic Base MB-BV (manufactured by Kanetsu Kogyo K.K.)

3) Magnetic material

Iron Powder (made by Komune Kagaku Yakuhin K.K.: reagent)

Magnetic powder (KBC100 and KBC200: magnetic powders for copier made by Kanto Denka Kogyo K.K.)

4) Highly water-absorbable resin

KI Gel 201K Powder (a tradename for an isobutylene-maleic anhydride copolymer made by Kuraray Co., Ltd.)

Sunwet IM1000 Powder (a tradename for a starch-acrylic acid graft polymer made by Sanyo Kasei K.K.)

Aquareserve GP-3 Powder (a tradename for a polyvinyl alcohol-maleic anhydride copolymer made by Japan Synthetic Rubber Co., Ltd.)

EXAMPLE 1

One thousand grams of water was added to 100 g of KI Gel 201K Powder to form an aqueous gel. One hundred grams of a magnetic powder KBC100 was further added, and they were kneaded and dried at 107° C. to form a water absorbent. Five grams of this water absorbent was stirred together with 500 g of a slack coal (wherein the content of particles having a diameter of 3 mm or less was 80%) having a moisture content of 10% by a Hover type mixer for 3 minutes.

After the mixture was allowed to stand for 1 hour, the water absorbent that absorbed the moisture was recovered with a magnet. The moisture content and the bulk density of the slack coal were then measured. The recovered water absorbent was dried and then reused. The results are shown in Table 1.

As shown in Table 1, the moisture content of the slack coal was decreased with good efficiency. Moreover, the recovered water absorbent could be repeatedly used without decrease in water absorbability by removing type moisture absorbed into the highly water-absorbable resin via drying. Moreover, as a result of reducing the moisture content, the bulk density of the slack coal was improved.

TABLE 1

| Number of repeated uses of a water absorbent | | 1 | 5 | 10 |
| --- | --- | --- | --- | --- |
| Moisture content remaining in a slack coal after treatment % | | 4.2 | 3.9 | 4.5 |
| Bulk density of a slack coal (g/cc) | before treatment | 0.71 | 0.71 | 0.71 |
| | after treatment | 0.83 | 0.84 | 0.82 |

NOTE:
The moisture content of the slack coal before treatment was 10%.

EXAMPLE 2

Example 1 was repeated except changing the type of the highly water-absorbable resin as shown in Table 2. The results are shown in Table 2.

EXAMPLE 3

Using the water absorbents (KI Gel 201K/KBC100) in Example 1, a talc, a sand or wood chips were treated as in Example 1. The results are shown in Table 3.

From the results in Table 3, it follows that according to this invention, the moisture content was decreased with good efficiency regardless of the type of the powder.

EXAMPLE 4

Example 1 was repeated except changing the type of the magnetic material as shown in Table 4. The results are shown in Table 4.

TABLE 2

| Type of a highly water-absorbable resin | | Sunwet IM1000 | | Aqua-reserve GP-3 | |
| --- | --- | --- | --- | --- | --- |
| Number of repeated uses of a water absorbent | | 1 | 5 | 1 | 5 |
| Moisture content of a slack coal (%) | before treatment | 8.5 | 8.8 | 8.5 | 8.8 |
| | after treatment | 4.0 | 4.2 | 4.3 | 4.3 |

TABLE 3

| Type of a powder | | Talc | | Sand | | Wood chips | |
| --- | --- | --- | --- | --- | --- | --- | --- |
| Amount of a highly water-absorbable resin (%) | | 2% | | 5% | | 10% | |
| Number of repeated uses of a water absorbent | | 1 | 5 | 1 | 5 | 1 | 5 |
| Moisture content of a powder (%) | before treatment | 9.7 | 9.5 | 3.9 | 4.0 | 62.4 | 60.5 |
| | after treatment | 4.2 | 4.1 | 0.6 | 0.8 | 25.5 | 24.0 |

NOTE:
Absorbents are KI Gel 201K and KBC100.

TABLE 4

| Type of a magnetic material | | KBC200 | | Iron powder | |
| --- | --- | --- | --- | --- | --- |
| Number of repeated uses of a water absorbent | | 1 | 5 | 1 | 5 |
| Moisture content of a slack coal (%) | before treatment | 10.9 | 10.5 | 10.9 | 10.5 |
| | after treatment | 4.1 | 3.7 | 4.8 | 4.4 |

NOTE:
A highly water-absorbable resin was KI Gel 201K.

EXAMPLE 5

Maleic anhydride (27 g), 20 g of isobutylene, 53 g of benzene and 54 g of an iron powder were charged into a stainless steel reaction vessel, and 0.4 g of 2,2'-azobisisobutylonitrile was added. The mixtre was polymerized at 60° C. for 10 hours to obtain 52 g of a copolymer.

After the polymerization was over, 13.5 g of sodium hydroxide and 194.5 g of water were added to the reaction system, and sodium hydroxide was reacted with the copolymer. Then, benzene was removed to prepare an aqueous solution of the copolymer.

Subsequently, 0.3 g of polyethylene glycol diglycidyl ether was added to the aqueous solution, and the mixtre was heated at 160° C. for 3 hours to crosslink the copolymer. The crosslinked copolymer was further heated at the same temperature for 1 hour to afford a highly water-absorbable resin containing the iron powder.

The iron powder-containing highly water-absorbable resin was ground to a diameter of about 3 mm and used to decrease the moisture content of the slack coal as in Example 1. The results are shown in Table 5.

TABLE 5

| Number of repeated uses of a water absorbent | 1 | 5 |
| --- | --- | --- |
| Moisture content of a slack coal before treatment (%) | 10.9 | 10.5 |
| Moisture content remaining in a slack coal after treatment (%) | 3.7 | 3.9 |

COMPARATIVE EXAMPLES

Five-hundred grams of the slack coal containing the moisture content of 10%, which was used in Example 1, was treated by the process of this invention (using KI Gel 201K/KBC100 as water absorbents) or the following conventional methods. The results are shown in Table 6.

CONVENTIONAL METHOD I

One hundred grams of water was added to 10 g of KI Gel 201K Powder to spread the powder flat. Then, the moisture was removed to form plate-like pieces each having a thickness of about 1 mm and a diameter of about 10 mm. The plate-like pieces and the slack coal were mechanically mixed, allowed to stand for 1 hour, and then separated from each other using a sieve having a JIS-nominal size of 4.76 mm. The plate-like pieces were then dried with a dryer at 107° C. for 1 hour to remove the moisture, and repeatedly reused.

CONVENTIONAL METHOD II

KL Gel 201K Powder (0.5 g) was packed in each of ten cloth bags, and mechanically mixed with a slack coal. After the mixture was allowed to stand for 1 hour, the slack coal and the cloth bag were separated using a sieve having a JIS-nominal size of 4.76 mm. The cloth bag was then dried with a dryer at 107° C. for 1 hour to remove the moisture, and repeatedly reused.

CONVENTIONAL METHOD III

A nonwoven fabric of acrylic fibers (LANSEAL HP-6, a tradename for a product made by Nippon Exlan Kogyo K.K.) was finely divided to a diameter of about 10 mm, and mechanically mixed with a slack coal. The mixture was allowed to stand for 1 hour, and then separated into the slack coal and the nonwoven fabric by a sieve having a JIS-nominal size of 4.76 mm. The nonwoven fabric was then dried at 107° C. for 1 hour with a dryer to remove the moisture, and repeatedly reused.

From Table 6, it becomes apparent that as the slack coal and the highly water-absorbable resin pieces are separated using the sieve in Conventional Method I, the resin pieces were finely divided and became unusable during the repeated use, and that in Conventional Methods II and III, the contact with the slack coal is poor and the moisture content cannot be decreased with good efficiency compared to the process of this invention.

TABLE 6

| Method for decreasing a moisture content of a slack coal | | Conventional method I | | Conventional method II | | Conventional method III | | Method of this invention | |
|---|---|---|---|---|---|---|---|---|---|
| Number of repeated uses of a water absorbent | | 1 | 3 | 1 | 5 | 1 | 5 | 1 | 5 |
| Moisture content of a slack coal (%) | before treatment | 9.7 | 9.5 | 9.7 | 9.5 | 9.7 | 9.5 | 10.0 | 10.1 |
| | after treatment | 5.3 | * | 8.9 | 8.8 | 8.5 | 8.4 | 4.2 | 3.9 |

*During the repeated use, the water absorbent was finely divided and became unusable.

What we claim is:

1. A pulverulent water absorbent having a diameter of 1 to 3 mm comprising
    a magnetic material selected from the group consisting of pure iron and iron alloy and
    a water-absorbent resin obtained by crosslinking either physically or chemically at least one water-soluble high-molecular weight compound selected from the group consisting of a starch-acrylonitrile copolymer hydrolyzate, a vinyl alcohol-acrylic acid salt copolymer, a polyacrylic acid salt and an olefin-maleic anhydride copolymer hydrolyzate, said water-absorbent resin having an absorbability such as to absorb distilled water in a weight which is 5–1000 times its own weight.

2. The water absorbent of claim 1 wherein a magnetic material/water-absorbent resin weight ratio is 1/20 to 5/1.